United States Patent
Inoue et al.

(10) Patent No.: US 7,319,579 B2
(45) Date of Patent: Jan. 15, 2008

(54) SNUBBER CIRCUIT

(75) Inventors: Tomoki Inoue, Ibo-gun (JP); Koichi Sugiyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 11/185,744

(22) Filed: Jul. 21, 2005

(65) Prior Publication Data

US 2006/0018074 A1    Jan. 26, 2006

(30) Foreign Application Priority Data

Jul. 22, 2004    (JP) ............................. 2004-214395

(51) Int. Cl.
*H02H 9/06* (2006.01)
*H02H 7/12* (2006.01)

(52) U.S. Cl. ........................................ 361/118; 363/56
(58) Field of Classification Search ............... 361/91.7, 361/56, 111
See application file for complete search history.

(56) References Cited

U.S. PATENT DOCUMENTS

| | | | |
|---|---|---|---|
| 5,828,559 A * | 10/1998 | Chen ........................ | 363/56.05 |
| 5,936,387 A | 8/1999 | Tabata et al. | |
| 6,268,990 B1 | 7/2001 | Ogura et al. | |
| 6,518,739 B2 * | 2/2003 | Wald et al. .................. | 323/351 |
| 2004/0109270 A1* | 6/2004 | Stockinger et al. ........... | 361/56 |

FOREIGN PATENT DOCUMENTS

| | | |
|---|---|---|
| JP | 2000-12780 | 1/2000 |
| JP | 2000-92817 | 3/2000 |
| JP | 2000-324797 | 11/2000 |

* cited by examiner

*Primary Examiner*—Michael Sherry
*Assistant Examiner*—Boris Benenson
(74) *Attorney, Agent, or Firm*—Oblon, Spivak, McClelland, Maier & Neustadt, P.C.

(57) ABSTRACT

A snubber circuit has a voltage detection circuit which detects that a voltage between first and second terminals exceeds a predetermined voltage, a protection circuit which performs control to prevent an overvoltage between the first and second terminals when the voltage detection circuit detects that the voltage between the first and second terminals exceeds the predetermined voltage, and a voltage control circuit which bypasses a portion of a main current flowing between the first and second terminals to the protection circuit when the voltage detection circuit detects that the voltage between the first and second terminals exceeds the predetermined voltage.

16 Claims, 7 Drawing Sheets

F I G. 1

F I G. 2

F I G. 3

F I G. 4

F I G. 5

F I G. 6

F I G. 7

F I G. 8

F I G. 9

F I G. 10

F I G. 11

F I G. 12

F I G. 13

SNUBBER CIRCUIT

CROSS REFERENCE TO RELATED APPLICATIONS

This application is based upon and claims the benefit of priority from the prior Japanese Patent Application No. 2004-214395, filed on Jul. 22, 2004, the entire contents of which are incorporated herein by reference.

BACKGROUND OF THE INVENTION

1. Field of the Invention

The present invention relates to a snubber circuit for suppressing a surge voltage generated when a semiconductor switch used for a power converter turns OFF.

2. Related Art

A conventional snubber circuit provided with a capacitor for detecting a voltage between both ends of a semiconductor switch such as IGBT is known. This kind of capacitor is precharged with a power supply voltage and when a voltage higher than the supply voltage is applied to a device turned OFF due to energy stored in a parasitic inductance which exists in a main circuit, the capacitor absorbs the energy and suppresses a surge voltage. This operation is repeated every time the semiconductor device performs switching.

In this kind of conventional snubber circuit voltage detection lines of the capacitor are cross-connected, which results in a problem that the snubber circuit cannot be provided corresponding to each of a plurality of serially-connected semiconductor switches. Furthermore, the capacitor in the snubber circuit must have a high breakdown voltage structure when the supply voltage is a high voltage, which increases the cost and size.

In order to solve these problems, a circuit is disclosed (see Japanese Patent Laid-Open No. 2000-12780, Japanese Patent Laid-Open No. 2000-92817) which makes it possible to reduce the size and protect a plurality of serially-connected semiconductor switches from overvoltages.

However, such a circuit uses a high breakdown voltage and expensive device such as a zener diode or IGBT for voltage detection, which increases the cost of the snubber circuit.

SUMMARY OF THE INVENTION

According to one embodiment of the present invention, a snubber circuit comprising: a voltage detection circuit which detects that a voltage between first and second terminals exceeds a predetermined voltage; a protection circuit which performs control to prevent an overvoltage between the first and second terminals when the voltage detection circuit detects that the voltage between the first and second terminals exceeds the predetermined voltage; and a voltage control circuit which bypasses a portion of a main current flowing between the first and second terminals to the protection circuit when the voltage detection circuit detects that the voltage between the first and second terminals exceeds the predetermined voltage.

Furthermore, according to one embodiment of the present invention, snubber circuit comprising: a voltage detecting circuit which has a capacitor of which a voltage at both ends changes in accordance with a voltage between first and second terminals; a protection circuit connected between the first and second terminals, which performs control to prevent an overvoltage between the first and second terminals; and a voltage control circuit which bypasses a portion of a main current flowing between the first and second terminals to the protection circuit when a voltage at both ends of the capacitor exceeds a predetermined voltage.

DETAILED DESCRIPTION OF THE INVENTION

With reference now to the attached drawings, an embodiment of the present invention will be explained below.

First Embodiment

Figure 1:
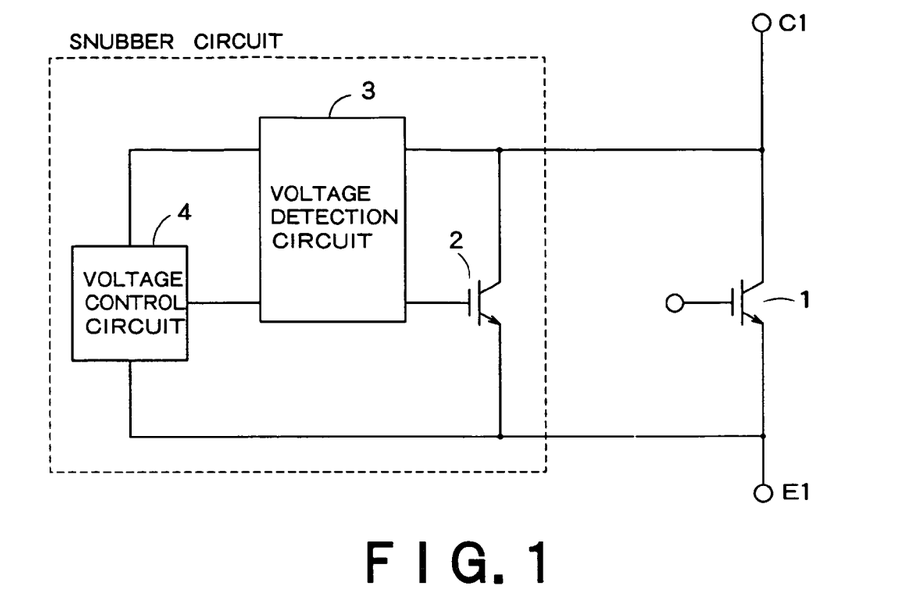
FIG. 1 is a block diagram showing a schematic structure of a snubber circuit according to a First Embodiment of the present invention.

FIG. 1 is a block diagram showing a schematic structure of a snubber apparatus according to a First Embodiment of the present invention. The snubber apparatus in FIG. 1 is connected in parallel between a collector and an emitter of an IGBT 1 which is to be protected. As shown by a dotted line in the figure, the snubber circuit in FIG. 1 is provided with an IGBT 2 which is connected in parallel between the collector and emitter of the IGBT 1, a voltage detection circuit 3 which detects a voltage standing in correlation with the collector-emitter voltage of the IGBT 2 and a voltage control circuit 4 which controls a gate voltage of the IGBT 2 based on the detection result of the voltage detection circuit 3 and controls the collector-emitter voltage of the IGBT 1.

The voltage detection circuit 3 in FIG. 1 detects a collector-gate voltage of the IGBT 2 as a voltage standing in correlation with the collector-emitter voltage of the IGBT 1, but as will be described later, the voltage detection circuit 3 may also be adapted so as to directly detect the collector-emitter voltage of the IGBT 1.

Figure 2:
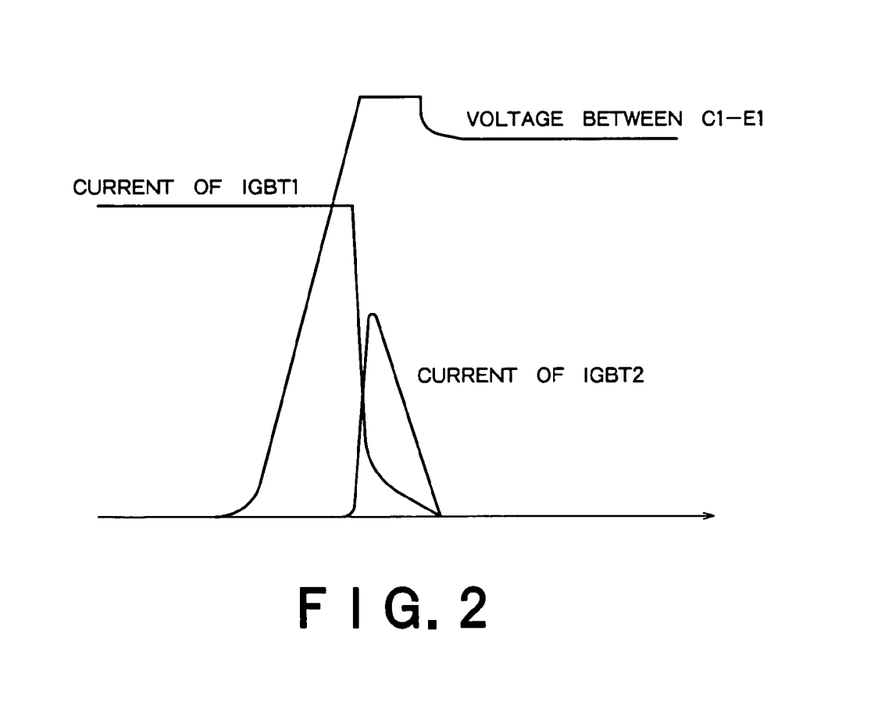
FIG. 2 shows voltage and current waveforms of the respective parts of the snubber circuit in FIG. 1.

FIG. 2 shows voltage and current waveforms of the respective parts of the snubber circuit in FIG. 1 showing waveform diagrams of the collector-emitter current of the IGBT 1, collector-emitter voltage of the IGBT 1 and collector-emitter current of the IGBT 2.

When the IGBT 1 is ON, a main current only flows between the collector and emitter of the IGBT 1, while the IGBT 2 is OFF and no current flows.

When the IGBT 1 turns OFF, the collector-emitter voltage of the IGBT 1 increases drastically due to energy discharged from a parasitic inductance which exists in the main circuit including the IGBT 1 and exceeds the supply voltage. When the collector-emitter voltage reaches a predetermined voltage over the supply voltage, the voltage detection circuit 3 notifies the voltage control circuit 4 that the collector-emitter voltage of the IGBT 1 has exceeded the predetermined voltage. The voltage control circuit 4 increases the gate voltage of the IGBT 2 to cause the IGBT 1 to bypass part of the current which is supposed to flow between the collector and emitter of the IGBT 1. More specifically, the voltage control circuit 4 adjusts the gate voltage of the IGBT 2 in a state in which a predetermined voltage is applied between the collector and emitter of the IGBT 2 so that part of the main current flows into the IGBT 2.

This causes a protection circuit current branched from the main current to flow into the IGBT 2 and keeps the collector-emitter voltage of the IGBT 1 substantially constant. Soon, a surge current flowing through the IGBT 1 reduces, the current flowing through the IGBT 2 also reduces accordingly and the collector-emitter voltage of the IGBT 1 becomes substantially constant. All the above-described process prevents any overvoltage from applying to the IGBT 1 and improves stability of the turn-OFF operation.

Means whereby the voltage detection circuit 3 detects a voltage is related to a variation in the capacitance. A variation in the capacitance can be detected accurately using an AC bridge circuit, etc., and since a leakage current thereof is lower than that of a resistance element, voltage detection using the AC bridge circuit is better than voltage detection by means of voltage division using a plurality of resistors. Furthermore, a signal sent from the voltage detection circuit 3 to the voltage control circuit 4 may be either an analog signal or a digital signal.

Thus, in the First Embodiment, when the IGBT 1 turns OFF, the voltage detection circuit 3 detects whether the collector-emitter voltage of the IGBT 1 has exceeded a predetermined voltage or not and when the collector-emitter voltage of the IGBT 1 exceeds the predetermined voltage, part of the main current is bypassed to the IGBT 2 connected in parallel to the IGBT 1, which prevents the collector-emitter voltage of the IGBT 1 from exceeding the predetermined voltage when the IGBT 1 turns OFF and can thereby suppress an overvoltage. The capacitor in the voltage detection circuit 3 detects the collector-emitter voltage of the IGBT 1, and therefore it is possible to accurately detect whether the voltage reaches an overvoltage or not.

Second Embodiment

The IGBT to be protected is made up of a plurality of devices, and when the current capacity is large, the current capacity of the snubber circuit needs to be increased. In this case, the IGBT 2 is preferably made up of a plurality of devices.

Figure 3:
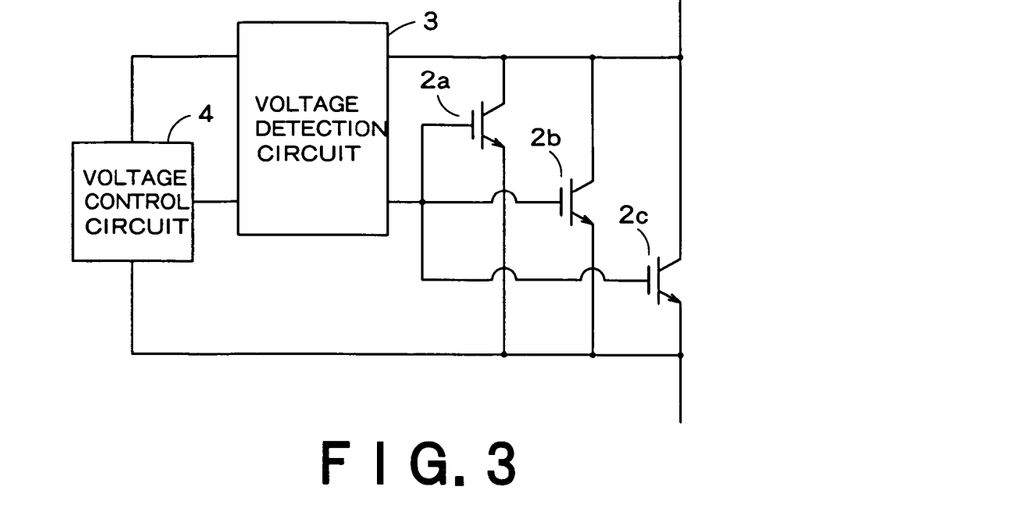
FIG. 3 is a block diagram of a snubber circuit according to a Second Embodiment showing an example where a plurality of IGBTs 2 are connected in parallel.

FIG. 3 is a block diagram of a snubber circuit according to a Second Embodiment showing an example where a plurality of IGBTs 2 are connected in parallel. In FIG. 3, the IGBT 1 is omitted, but the IGBT 1 is connected in parallel to the IGBTs 2 as in the case of FIG. 1. The IGBT 1 will be omitted in all figures which will be explained hereafter, but suppose the IGBT 1 is actually connected in parallel to the IGBT 2 as in the case of FIG. 1.

The snubber circuit in FIG. 3 is provided with a plurality of IGBTs 2a, 2b and 2c connected in parallel between the collector and emitter of the IGBT 1 (not shown in FIG. 3), a voltage detection circuit 3 and a voltage control circuit 4. The voltage detection circuit 3 and the voltage control circuit 4 are provided corresponding to the respective IGBTs 2a, 2b and 2c. FIG. 3 shows an example where three IGBTs 2 are connected in parallel, but the number of the IGBTs 2 is not particularly limited.

The gates of the plurality of IGBTs 2a, 2b and 2c are connected together, their collectors and emitters are also connected together, respectively. The voltage detection circuit 3 detects collector-gate voltages of the plurality of IGBTs 2a, 2b and 2c and detects whether these voltages exceed a predetermined voltage or not. The voltage control circuit 4 controls the gate voltages of the plurality of IGBTs 2a, 2b and 2c based on the detection results of the voltage detection circuit 3.

When the collector-emitter voltage of the IGBT 1 exceeds the predetermined voltage, part of the main current flowing through the IGBT 1 flows between the collectors and emitters of the plurality of IGBTs 2a, 2b and 2c. Since the plurality of IGBTs 2a, 2b and 2c are connected in parallel, it is possible to reduce a current that flows into one IGBT 2.

Figure 4:
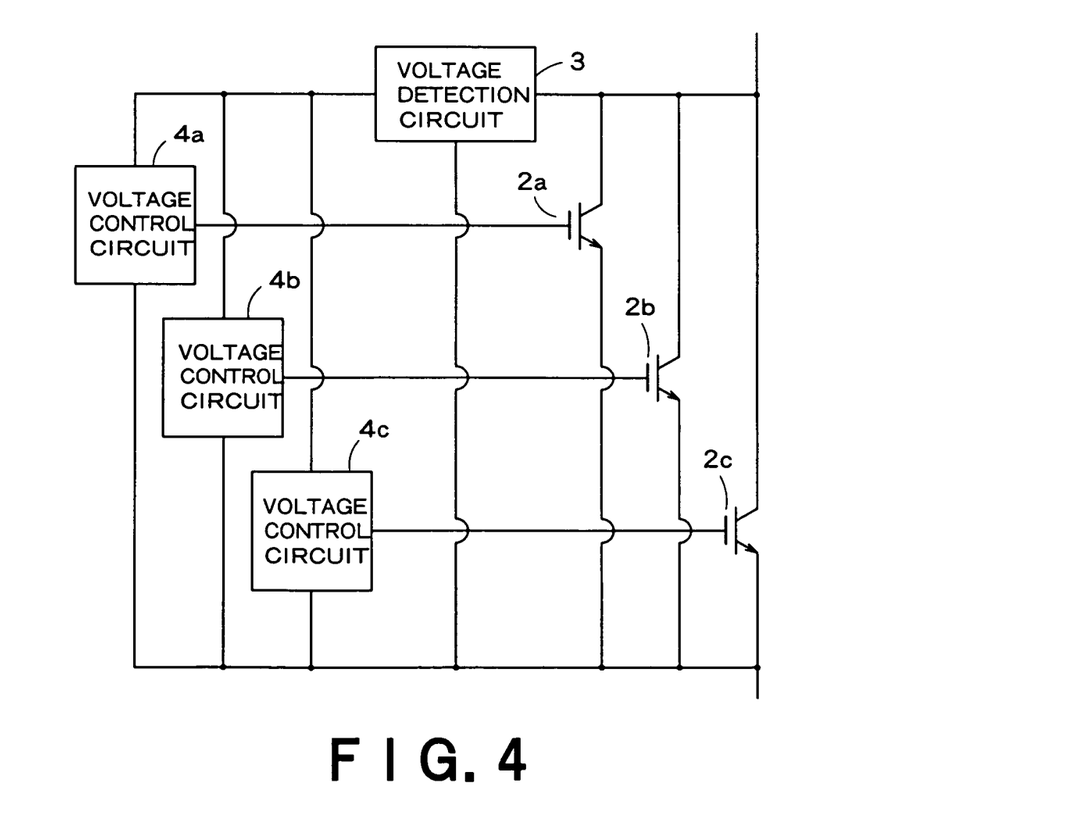
FIG. 4 is a block diagram showing an example of a snubber circuit provided with a plurality of voltage control circuits.

As a modification example of FIG. 3, it is also possible to provide a plurality of voltage control circuits 4a, 4b and 4c corresponding to the respective IGBTs 2a, 2b and 2c. FIG. 4 is a block diagram showing an example of a snubber circuit provided with a plurality of voltage control circuits 4a, 4b and 4c. The snubber circuit in FIG. 4 is provided with the plurality of voltage control circuits 4a, 4b and 4c corresponding to the respective IGBTs 2a, 2b and 2c. These voltage control circuits 4a, 4b and 4c are connected to a common voltage detection circuit 3.

When the collector-emitter voltage of the IGBT 1 exceeds a predetermined voltage, the voltage control circuits 4a, 4b and 4c control the gate voltages of the corresponding IGBTs 2.

Thus, in the Second Embodiment, a plurality of IGBTs 2a, 2b and 2c are connected in parallel to the IGBT 1, and therefore it is possible to prevent an overvoltage of the IGBT 1 even when the IGBT 1 has a large current capacity.

Third Embodiment

A Third Embodiment gives a concrete form to the inner structures of the voltage detection circuit 3 and the voltage control circuit 4 in the snubber circuit in FIG. 1.

Figure 5:
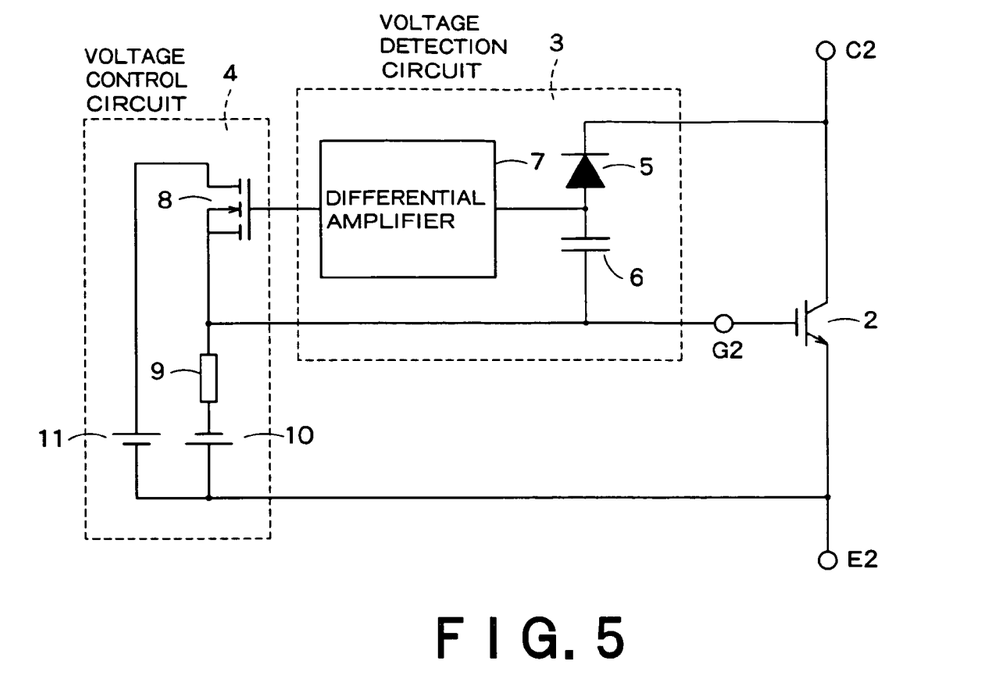
FIG. 5 is a circuit diagram of a snubber circuit according to a Third Embodiment of the present invention.

FIG. 5 is a circuit diagram of a snubber circuit according to a Third Embodiment of the present invention. The basic structure of the snubber circuit in FIG. 5 is the same as that of the circuit in FIG. 1. The voltage detection circuit 3 is provided with a high breakdown voltage diode 5 and a capacitor 6 serially-connected between the collector and gate of the IGBT 2 and a differential amplifier 7 which outputs a voltage corresponding to a difference voltage between the voltage in a connection path between the high breakdown voltage diode 5 and the capacitor 6 and a predetermined reference voltage. The differential amplifier 7 need not always be a complicated circuit such as an operational amplifier and can be a source-grounded amplifier in which a reference voltage is connected to a source terminal of a MOSFET.

An anode terminal of the high breakdown voltage diode 5 is connected to the capacitor 6 and a cathode terminal is connected to the collector of the IGBT 2. The breakdown voltage of the high breakdown voltage diode 5 is on par with the breakdown voltages of the IGBT 1 and IGBT 2.

The high breakdown voltage diode 5 is designed so that a junction capacitance thereof is smaller than the capacitance of the capacitor 6 at approximately a rated voltage of the capacitor 6. Therefore, when the collector-gate voltage of the IGBT 2 increases, an extra voltage is applied to the high breakdown voltage diode 5 rather than the capacitor 6. For this reason, while the high breakdown voltage diode 5 must have a high breakdown voltage function, the capacitor 6 having a low-breakdown voltage function can be used, which allows the cost and size of the capacitor 6 to be reduced.

The voltage control circuit 4 is provided with a MOSFET 8, to the gate of which an output signal of the differential amplifier 7 is input, a resistance element 9 which is serially-connected to the MOSFET 8, a DC power supply 10 connected to the resistance element 9 and a DC power supply 11 with a voltage polarity opposite to the DC power supply.

The MOSFET 8 turns ON when the voltage at the cathode terminal of the high breakdown voltage diode 5 in the voltage detection circuit 3 reaches a predetermined voltage. The DC power supply 11 is connected in such a way that the drain of the MOSFET 8 has a higher potential than that of the emitter of the IGBT 2. On the other hand, the DC power supply 10 is connected in such a way that the gate of the IGBT 2 has a lower potential than that of the emitter of the IGBT 2. The DC power supply 10 is provided for the purpose of keeping the IGBT 2 in an OFF state when the MOSFET 8 is OFF and is not an essential component.

Furthermore, it is also possible to set the gate terminal to a voltage higher than that of the emitter terminal within a range that the IGBT 2 does not turn ON.

Next, the operation of the snubber circuit in FIG. 5 will be explained. When the IGBT 1 to be protected is ON, the potential difference between the collector and emitter of the IGBT 2 is small, and therefore the MOSFET 8 remains OFF. The gate of the IGBT 2 is negatively biased with respect to the emitter and the IGBT 2 is OFF and no current flows.

When the IGBT 1 to be protected starts a turn-OFF operation, the collector-emitter voltage of the IGBT 2 increases and the collector-gate voltage also increases. At this time, the voltage loads on the capacitor 6 and the diode 5 are determined according to the ratio in junction capacitance between the capacitor 6 and diode 5. As the collector-emitter voltage of the IGBT 2 increases, the junction capacitance of the diode 5 decreases, and therefore if the junction capacitance of the diode 5 at approximately a rated voltage of the capacitor 6 is small, the diode 5 assumes most of the load of the collector-gate voltage, preventing a high voltage from applying to the capacitor 6.

Therefore, a high voltage is not applied to the capacitor 6 and the differential amplifier 7 and it is possible to use low-breakdown-voltage (less than 100 V) and low-cost ones. The diode 5 is required to have a breakdown voltage on par with those of the IGBT 1 and IGBT 2, but the diode 5 can have a small current capacity and requires only a small active area. The diode 5 can be manufactured at a lower cost than a MOS gate device such as IGBT, and therefore the entire snubber circuit can be provided in a smaller size and at lower cost than the conventional one.

When the collector-emitter voltage of the IGBT 2 reaches a predetermined voltage more than the power supply voltage, the voltage of the capacitor 6 exceeds a voltage preset for the differential amplifier 7 and the MOSFET 8 turns ON. This causes a current to flow into the circuit made up of the DC power supply 11, DC power supply 10, resistance element 9 and MOSFET 8 in the voltage control circuit 4 and the gate of the IGBT 2 is set to a voltage determined by the resistances and electromotive forces of the respective elements in the voltage control circuit 4. More specifically, the gate voltage of the IGBT 2 is adjusted to a level at which part of the main current flows through the IGBT 2 in a state in which a predetermined voltage is applied between the collector and emitter of the IGBT 2. As a result, a protection circuit current branched from the main current flows into the IGBT 2 and the collector-emitter voltage of the IGBT 2 becomes substantially constant.

In this way, it is possible to prevent an overvoltage from being applied to the IGBT 1 to be protected and improve stability of the turn-OFF operation of the IGBT 1.

Figure 6:
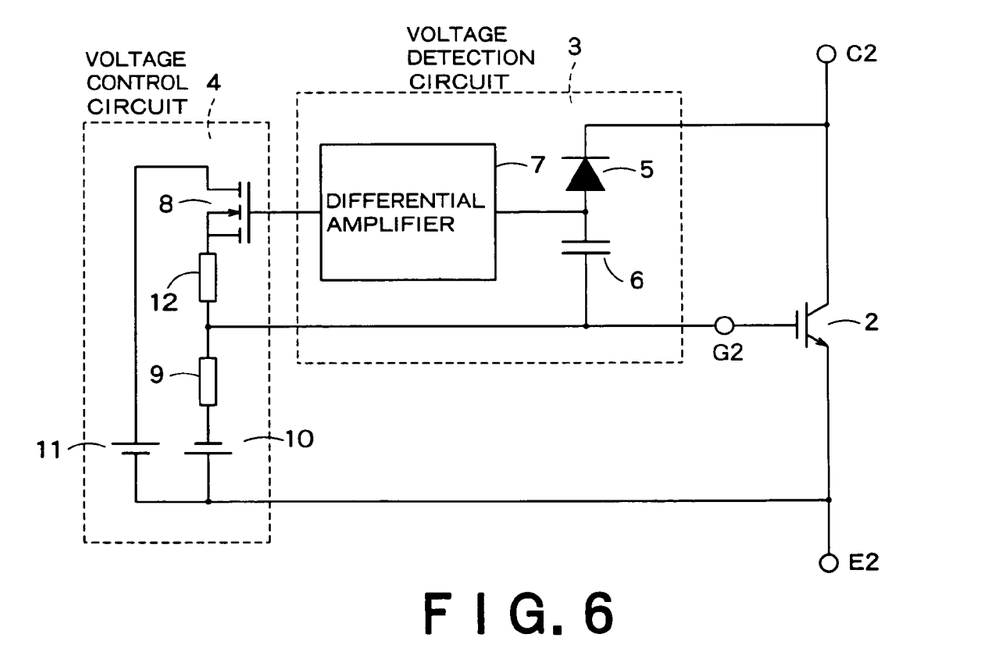
FIG. 6 is a block diagram of a snubber circuit showing a modification example of FIG. 5.

FIG. 6 is a block diagram of a snubber circuit showing a modification example of FIG. 5. A voltage control circuit 4 in FIG. 6 includes a resistance element 12 connected between a MOSFET 8 and the gate of the IGBT 2 for stabilizing the gate voltage of the IGBT 2.

Figure 7:
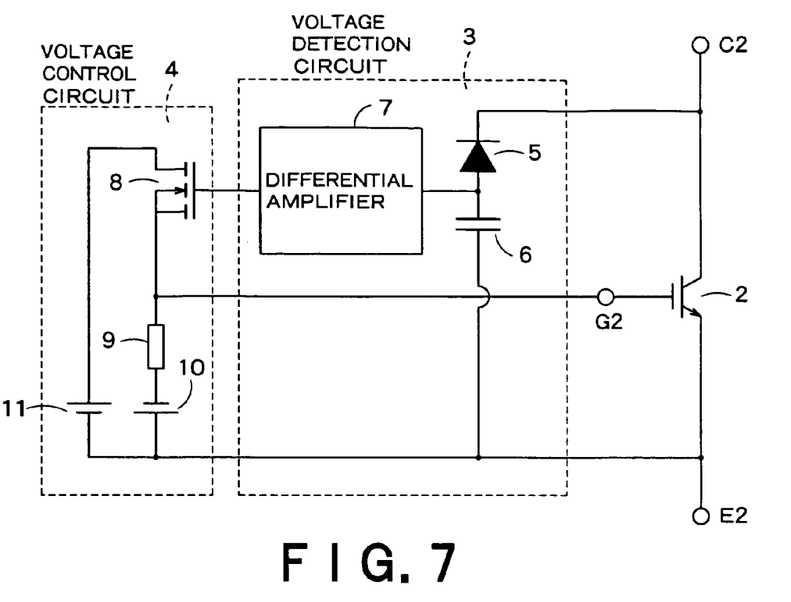
FIG. 7 is a block diagram of a snubber circuit showing another modification example of FIG. 5.

Furthermore, FIG. 7 is a block diagram of a snubber circuit showing another modification example of FIG. 5. A voltage detection circuit 3 in FIG. 7 includes a diode 5 and capacitor 6 serially-connected between the collector and emitter of the IGBT 2. FIG. 7 is different from FIG. 5 in that an end of the capacitor 6 is connected to the emitter of the IGBT 2.

In the case of FIG. 7, the collector-emitter voltage of the IGBT 2 is directly detected, and therefore it is possible to detect a surge voltage when the IGBT 1 turns OFF more accurately than in FIG. 5.

Figure 8:
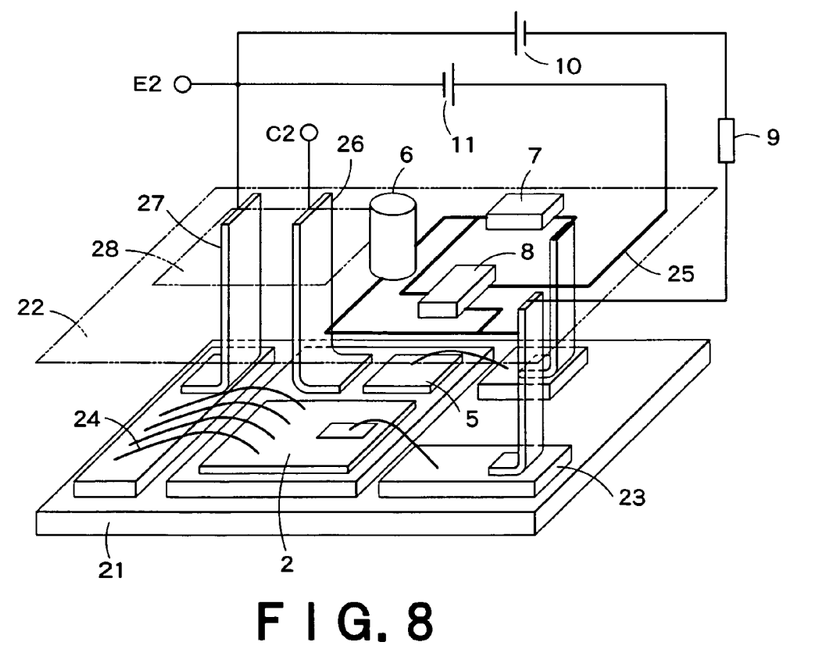
FIG. 8 is a perspective view showing a mounting example of the snubber circuit in FIG. 5.

FIG. 8 is a perspective view showing a mounting example of the snubber circuit in FIG. 5. The snubber circuit in FIG. 8 is constructed of an insulating substrate 21 and a printed circuit board 22. A copper foil pattern 23 is formed on the insulating substrate 21. The insulating substrate 21 is formed on a base plate, surrounded by resin and an area surrounded by the resin and base plate is filled with sealing resin. Though not shown, copper foil for preventing warpage is formed on a rear face of the insulating substrate 21. The IGBT 2 and diode 5 are mounted on the copper foil pattern 23 using solder or a conductive adhesive. The IGBT 2, diode 5 and copper foil pattern 23 are connected using bonding wires 24. The DC power supply 10, DC power supply 11 and resistance element 9 may also be provided outside both substrates or may be mounted on either substrate. A collector electrode 26 and an emitter electrode 27 of the IGBT 2 are mounted on the copper foil pattern 23.

The capacitor 6, differential amplifier 7 and MOSFET 8 are formed on the printed circuit board 22. These components are connected to each other by a wiring pattern 25 on the printed circuit board 22. A hole 28 to allow the collector electrode 26 and emitter electrode 27 of the IGBT 2 to pass is formed in part of the printed circuit board 22.

While the insulating substrate 21 is made at high cost because the copper foil pattern 23 is formed, the printed circuit board 22 is made at low cost. In this embodiment, components not requiring a high breakdown voltage are formed on the printed circuit board 22, and therefore it is possible to drastically reduce the size of the costly insulating substrate 21 and reduce component costs.

Thus, the Third Embodiment provides the serially-connected diode 5 and capacitor 6 in the voltage detection circuit 3 and detects the collector-emitter voltage of the IGBT 1, and therefore even when the collector-emitter voltage of the IGBT 1 increases, the increase can be absorbed by the diode 5 and it is possible to detect the voltage between the collector and emitter of the IGBT 1 without increasing the voltage between both ends of the capacitor 6. Therefore, it is possible to use the low-breakdown voltage capacitor 6, reduce components costs and reduce the area in which the circuit is formed.

Fourth Embodiment

A Fourth Embodiment differs from the first to Third Embodiments in the circuit configuration of the voltage detection circuit 3.

Figure 9:
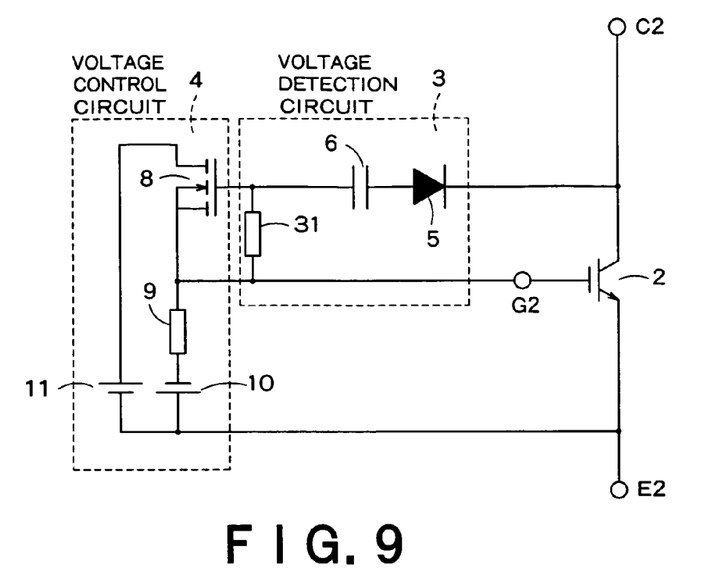
FIG. 9 is a block diagram of a snubber circuit according to a Fourth Embodiment of the present invention.

FIG. 9 is a block diagram of a snubber circuit according to a Fourth Embodiment of the present invention. The snubber circuit in FIG. 9 has an inner structure of the voltage detection circuit 3 different from that in FIG. 7. The voltage detection circuit 3 in FIG. 9 includes a high breakdown-voltage diode 5, a capacitor 6 and a resistance element 31 serially-connected between the collector and base of the IGBT 2. A cathode terminal of the high breakdown-voltage diode 5 thereof is connected to the collector of the IGBT 2 and an anode terminal is connected to the capacitor 6.

The voltage detection circuit 3 has no differential amplifier 7 and the voltage in the connection path between the capacitor 6 and resistance element 31 is applied to the gate of the MOSFET 8 in the voltage control circuit 4.

As in the case of FIG. 7, the high breakdown voltage diode 5 has a breakdown voltage on par with the breakdown voltages of the IGBT 1 and IGBT 2. The diode 5 is designed in such a way that the junction capacitance of the high breakdown voltage diode 5 is smaller than the capacitance of the capacitor 6 at approximately a rated voltage of the capacitor 6.

The operation of the snubber circuit in FIG. 9 will be explained below. When the IGBT 1 to be protected is ON, the gate potential of the MOSFET 8 is on par with the gate potential of the IGBT 2 and the MOSFET 8 turns OFF. In this state, a negative bias is applied from a DC power supply, and therefore the IGBT 2 turns OFF and no current flows into the IGBT 2.

When the IGBT 1 to be protected starts a turn-OFF operation, the collector-emitter voltage of the IGBT 2 increases. At this time, the voltage loads on the capacitor 6 and diode 5 are determined according to the ratio in junction capacitance between the capacitor 6 and diode 5. As the collector-emitter voltage of the IGBT 2 increases, the junction capacitance of the diode 5 decreases, and therefore if the junction capacitance of the diode 5 at approximately a rated voltage of the capacitor 6 is small, the diode 5 assumes most of the voltage load, preventing a high voltage from applying to the capacitor 6.

When the collector-emitter voltage of the IGBT 2 further increases, the junction capacitance of the diode 5 decreases and the entire capacitance including the capacitor 6 increase. Therefore, the current flowing into the capacitor 6 increases according to a rate of increase of the voltage between the collector and emitter. As a result, the potential difference between both ends of the resistance element 31 increases and the MOSFET 8 turns ON.

When the MOSFET 8 turns ON, a current flows into the voltage control circuit 4 made up of the DC power supply 11, DC power supply 10, resistance element 9 and MOSFET 8. Likewise, a current also flows into the circuit made up of the IGBT 2, high breakdown-voltage diode 5, capacitor 6, resistance element 31, resistance element 9 and DC power supply 10. The gate voltage of the IGBT 2 is determined by the impedances of the respective elements in these circuits and the voltages of the DC power supplies 10 and 11.

The gate voltage of the IGBT 2 increases as the rate of increase of the collector-emitter voltage increases. As the gate voltage increases, a current flows into the IGBT 2 more easily and the rate of voltage increase is suppressed. On the other hand, when the current flows into the IGBT 2 excessively, an adjustment is made so as to increase the rate of voltage increase.

Appropriately adjusting values of the respective elements in the snubber circuit can substantially suppress the voltage increase. This makes it possible to prevent an overvoltage from being applied to the IGBT to be protected and improve the stability of the turn-OFF operation.

Figure 10:
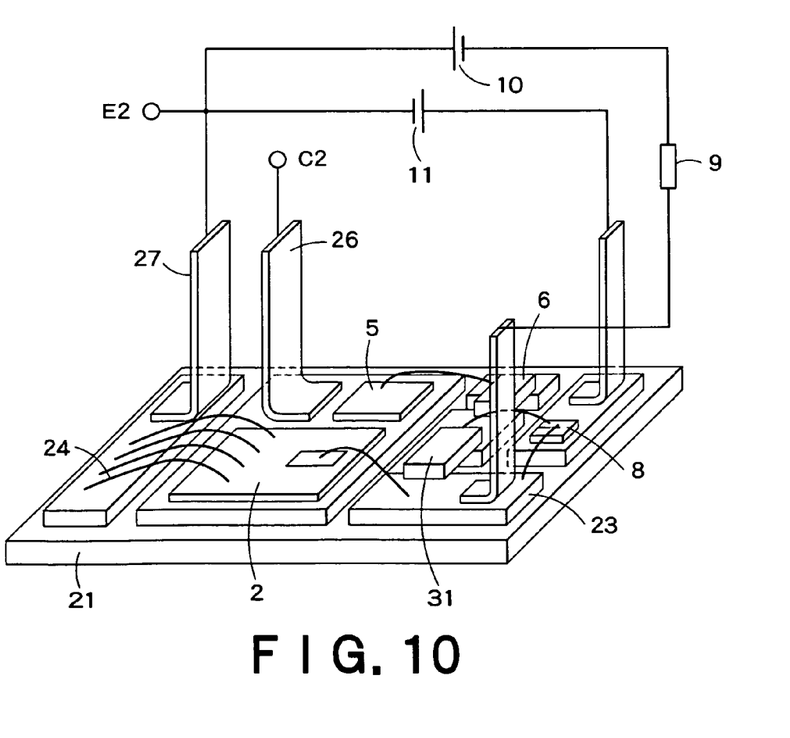
FIG. 10 is a perspective view showing an example of an embodiment of FIG. 9.

FIG. 10 is a perspective view showing an example of an embodiment of FIG. 9. Unlike FIG. 8, FIG. 10 shows an example where all components of the snubber circuit are mounted on a common insulating substrate 21. On the other hand, FIG. 11 as well as FIG. 8 is a perspective view showing an example where high breakdown voltage components are mounted on the insulating substrate 21 and low breakdown voltage components are mounted on the printed circuit board 22.

Figure 11:
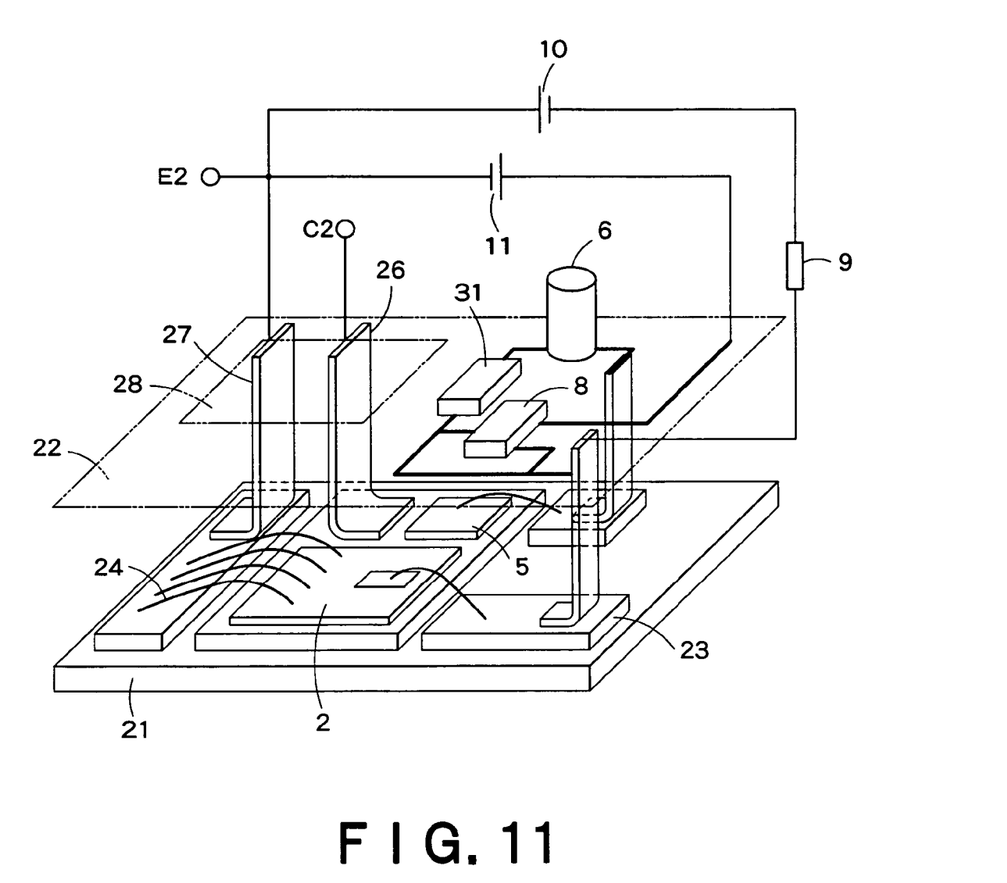
FIG. 11 is a perspective view showing an example where high breakdown voltage components are mounted on the insulating substrate 21 and low breakdown voltage components are mounted on the printed circuit board 22.

In the case of FIG. 11 as well as FIG. 8, the capacitor 6, resistance element 31 and MOSFET 8 are mounted on the printed circuit board 22, while the IGBT 2 and high breakdown voltage diode 5 are mounted on the insulating substrate 21.

Figure 12:
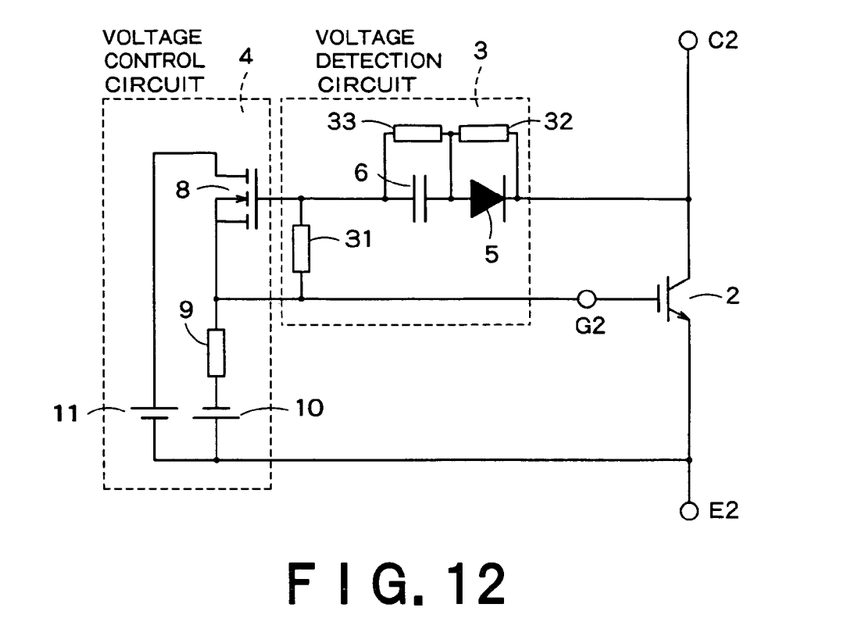
FIG. 12 is a block diagram showing a modification example of FIG. 9.

FIG. 12 is a block diagram showing a modification example of FIG. 9. FIG. 12 differs from FIG. 9 in that resistance elements 32, 33 are connected in parallel to the capacitor 6 and high breakdown voltage diode 5 in the voltage detection circuit 3 and the rest are the same as those in FIG. 9.

Providing the resistance elements 32, 33 can stabilize the voltages of the diode 5 and capacitor 6.

Figure 13:
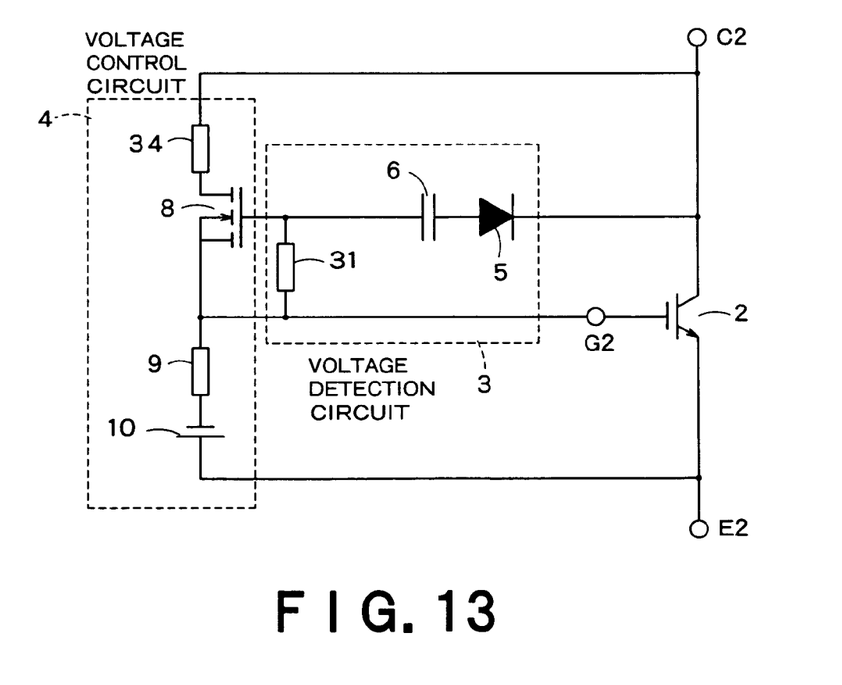
FIG. 13 is a block diagram showing another modification example of FIG. 9.

FIG. 13 is a block diagram showing another modification example of FIG. 9. The snubber circuit in FIG. 13 differs from FIG. 9 in the inner structure of the voltage control circuit 4. The voltage control circuit 4 in FIG. 13 includes a resistance element 34 connected between the drain of the MOSFET 8 and the collector of the IGBT 2. Furthermore, the DC power supply 11 provided in FIG. 9 is omitted.

Providing the resistance element 34 causes the drain voltage of the MOSFET 8 to be supplied from the collector of the IGBT 2 through the resistance element 34, eliminates the necessity for the DC power supply 11 in FIG. 9, and can thereby simplify the circuit configuration. Furthermore, when the IGBT 1 to be protected is ON, almost no voltage is applied to the MOSFET 8, which prevents erroneous operation of the snubber circuit.

Thus, the Fourth Embodiment can construct the voltage detection circuit 3 without the differential amplifier 7, and can thereby prevent an overvoltage between the collector and emitter of the IGBT 1 in a simple circuit configuration.

Fifth Embodiment

The above described embodiments have explained examples where the IGBT 1 and IGBT 2 are provided separately, but the IGBT 2 can also be used as a switch for power conversion. In this case, it is possible to provide a gate driver for generating a pulse voltage instead of the DC power supply 10 in FIG. 5 and the DC power supply 26 in FIG. 9 and connect the IGBT 2 to the main circuit. It is possible to prevent an overvoltage from being applied to the IGBT 2 even in this case.

The above described embodiments have explained examples where the IGBT is the protection target, but the protection target of the present invention is not limited to the IGBT and the protection target can be various types of semiconductor switches that can be turned ON/OFF such as MOSFET, GTO and bipolar transistor. Furthermore, the above described embodiments have explained examples where the device through which the protection current of the snubber circuit flows is an IGBT, but an insulated gate device such as MOSFET 8 can also be used instead of the IGBT. Furthermore, the device which drives the gate of the IGBT through which the protection current flows need not always be the MOSFET 8 and the device can also be an IGBT.

The present invention is not limited to the above described embodiments, but can be implemented modified in various ways without departing from the essence thereof in the stage of implementation. Furthermore, the above described embodiments include various stages of the invention and various inventions can be extracted depending on an appropriate combination of a plurality of components disclosed.

What is claimed is:

1. A snubber circuit including a protection circuit connected to a first terminal, a second terminal, and a control input terminal, comprising:
   a voltage detecting circuit including a capacitor and a diode connected in series between the first and second terminals, or between the first terminal and the control input terminal;
   the protection circuit connected between the first and second terminals, configured to prevent an overvoltage between the first and second terminals in accordance with a voltage of the control input terminal; and
   a voltage control circuit configured to bypass a portion of a main current flowing between the first and second terminals to the protection circuit when a voltage at both ends of the capacitor exceeds a predetermined voltage,
   wherein a cathode electrode of the diode is connected to a side of the first terminal, and an anode electrode of the diode is connected to a side of the second terminal or the control input terminal having a voltage lower than a voltage of the first terminal.

2. A snubber circuit according to claim 1,
   wherein the voltage detecting circuit includes a comparison circuit configured to output a signal indicating whether a voltage in a connection path between the diode and the capacitor exceeds the predetermined voltage, and
   wherein the voltage control circuit is configured to control operation of the protection circuit based on the output signal of the comparison circuit.

3. A snubber circuit according to claim 2,
   wherein the voltage control circuit includes:
   a semiconductor switch circuit switched to ON or OFF in accordance with the output signal of the comparison circuit;
   a first impedance element connected in series to the semiconductor switch circuit; and
   a direct power supply connected in series to the semiconductor switch circuit and the first impedance element,
   wherein the control input terminal is connected to a connection path between the semiconductor switch circuit and the first impedance element.

4. A snubber circuit according to claim 3 further comprising:
   a first substrate on which the semiconductor switch circuit and the diode are formed; and
   a second substrate on which the protection circuit and the voltage control circuit are formed.

5. A snubber circuit according to claim 2,
   wherein the voltage control circuit includes:
   a semiconductor switch circuit switched ON or OFF in accordance with the output signal of the comparison circuit;
   a first impedance element connected in series to the semiconductor switch circuit;
   a second impedance element connected in series to the first impedance element; and
   at least one direct power supply connected in series to the semiconductor switch circuit, the first impedance element and the second impedance element,
   the control input terminal being connected to a connection path between the first and second impedance elements.

6. A snubber circuit according to claim 1,
   wherein the protection circuit includes a transistor of which a collector or a drain is connected to one of the first and second terminals, and an emitter or a source is connected to the other of the first and second terminals; and
   the capacitor and the diode are connected in series between the first terminal and a base or a gate of the transistor being the control input terminal so that a junction capacitance of the diode becomes small as a voltage between the collector and the emitter, or between the drain and the source, of the transistor increases.

7. A snubber circuit according to claim 6,
   wherein the cathode electrode of the diode is connected to the first terminal, the anode electrode of the diode is connected to one end of the capacitor, and the other end of the capacitor is connected to a base or gate of the transistor.

8. A snubber circuit according to claim 1,
   wherein the protection circuit includes a transistor of which a collector or a drain is connected to one of the first and second terminals, and an emitter or a source is connected to the other of the first and second terminals; and
   a cathode electrode of the diode is connected to the first terminal, and an anode electrode of the diode is connected to one end of the capacitor and the other end of the capacitor is connected to the second terminal.

9. A snubber circuit according to claim 1,
   wherein the voltage detecting circuit includes:
   the diode connected in series to the capacitor; and
   a first impedance element connected in series to the capacitor,
   wherein the voltage control circuit is configured to control operation of the protection circuit based on a voltage of a connection path between the capacitor and the first impedance element.

10. A snubber circuit according to claim 9,
    wherein the protection circuit includes a semiconductor switch circuit of which a collector or a drain is connected to one of the first and second terminals, and an emitter or a source is connected to the other of the first and second terminals, the semiconductor switch circuit having the control input terminal; and the diode, the capacitor and the first impedance element are connected in series between the first terminal and the control input terminal of the semiconductor circuit, or between the collector and the emitter or between the drain and the source of the semiconductor switch circuit.

11. A snubber circuit according to claim 10,
wherein the voltage detecting circuit, the protection circuit and the voltage control circuit are formed on the same substrate.

12. A snubber circuit according to claim 9 further comprising,
a second impedance element connected in parallel at both ends of the capacitor; and
a third impedance element connected in parallel at both ends of the diode.

13. A snubber circuit according to claim 9,
wherein the voltage control circuit includes:
a semiconductor switch circuit switched to ON or OFF in accordance with a voltage of a connection path between the capacitor and the first impedance element;
a second impedance element connected in series to the semiconductor switch circuit; and
a direct power supply connected in series to the semiconductor switch circuit and the second impedance element,
wherein the control input terminal is connected to a connection path between the semiconductor switch circuit and the second impedance element.

14. A snubber circuit according to claim 13,
wherein the voltage control circuit includes a third impedance element of which one end is connected to the semiconductor switch circuit, and the other end is connected to the first terminal; and
the third impedance element, the semiconductor switch circuit and the second impedance element are connected in series between the first and second terminals in the aforementional order.

15. A snubber circuit according to claim 1,
wherein the protection circuit includes a plurality of transistors of which all collectors or drains are connected to one of the first and second terminals, all emitters or sources are connected to the other of the first and second terminals, and all bases or gates are connected to each other; and
the voltage detecting circuit is configured to detect that a voltage between the first and second terminals exceeds the predetermined voltage based on a voltage between the collectors and the bases or the gates, or between the drains and the gates of the plurality of transistors.

16. A snubber circuit according to claim 1,
wherein the protection circuit includes a plurality of transistors of which all collectors or drains are connected to one of the first and second terminals, and all emitters or sources are connected to the other of the first and second terminals; and
the voltage control circuit independently controls ON and OFF of the plurality of transistors based on a result detected by the voltage detecting circuit.

* * * * *